US 9,674,379 B2

(12) United States Patent
Nogawa et al.

(10) Patent No.: US 9,674,379 B2
(45) Date of Patent: Jun. 6, 2017

(54) RELAY APPARATUS, COMMUNICATION APPARATUS, AND CONTROL METHODS OF RELAY APPARATUS

(75) Inventors: Hideki Nogawa, Nagoya (JP); Masafumi Miyazawa, Nagoya (JP); Yusuke Shimada, Inazawa (JP); Takeshi Nagasaki, Nagoya (JP); Satoshi Watanabe, Nagoya (JP); Katsuaki Ito, Nagoya (JP); Hirokazu Banno, Iwakura (JP); Kazutaka Yamamoto, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 518 days.

(21) Appl. No.: 13/283,436

(22) Filed: Oct. 27, 2011

(65) Prior Publication Data

US 2012/0113463 A1   May 10, 2012

(30) Foreign Application Priority Data

Nov. 4, 2010   (JP) .................................. 2010-247404

(51) Int. Cl.
*G06F 15/00*   (2006.01)
*H04N 1/00*   (2006.01)

(52) U.S. Cl.
CPC ....... *H04N 1/00244* (2013.01); *H04N 1/0023* (2013.01); *H04N 1/00233* (2013.01);
(Continued)

(58) Field of Classification Search
CPC ............. H04N 1/0023; H04N 1/00233; H04N 1/00244; H04N 1/00427; H04N 1/00464;
(Continued)

(56) References Cited

U.S. PATENT DOCUMENTS

2002/0118389 A1*   8/2002   Fukuda .............. H04L 67/1008
                                                               358/1.15
2004/0128669 A1*   7/2004   Furst et al. ................... 717/178
(Continued)

FOREIGN PATENT DOCUMENTS

CN   101742136 A   6/2010
JP   2002-063108 A   2/2002
(Continued)

OTHER PUBLICATIONS

European Patent Office, extended European Search Report for European Patent Application No. 11182979.2 (counterpart to above-captioned patent application), dated Mar. 8, 2012.
(Continued)

*Primary Examiner* — Mark Milia
(74) *Attorney, Agent, or Firm* — Merchant & Gould P.C.

(57) ABSTRACT

A relay apparatus to be connected through a network to a server apparatus configured to store image data and a communication apparatus configured to acquire the image data from the server and output an image based on the acquired image data, the relay apparatus includes: a first receiving unit configured to receive a request for acquiring location information from the communication apparatus; an acquiring unit configured to acquire the location information for acquiring the image data from the server apparatus upon receipt of the request; and a transmitting unit configured to transmit the acquired location information to the communication apparatus.

12 Claims, 6 Drawing Sheets

(52) U.S. Cl.
CPC ..... *H04N 1/00427* (2013.01); *H04N 1/00464* (2013.01); *H04N 1/00501* (2013.01); *H04N 1/00973* (2013.01); *H04N 2201/0039* (2013.01); *H04N 2201/0094* (2013.01)

(58) Field of Classification Search
CPC ........... H04N 1/00501; H04N 1/00973; H04N 2201/0039; H04N 2201/0094
USPC ....................................................... 358/1.15
See application file for complete search history.

(56) References Cited

U.S. PATENT DOCUMENTS

| | | | |
|---|---|---|---|
| 2006/0264239 A1* | 11/2006 | Tominaga | ..................... 455/558 |
| 2007/0027857 A1 | 2/2007 | Deng et al. | |
| 2009/0007019 A1 | 1/2009 | Kobayashi et al. | |
| 2009/0083304 A1 | 3/2009 | Dornbach et al. | |
| 2009/0222420 A1* | 9/2009 | Hirata | ................... G06F 3/0484 |
| 2011/0078593 A1* | 3/2011 | Matsui | ......................... 715/760 |
| 2012/0084402 A1 | 4/2012 | Ito et al. | |

FOREIGN PATENT DOCUMENTS

| | | |
|---|---|---|
| JP | 2002244971 A | 8/2002 |
| JP | 2003-281030 A | 10/2003 |
| JP | 2005-269250 A | 9/2005 |
| JP | 2006-260335 A | 9/2006 |
| JP | 2009-009334 A | 1/2009 |

OTHER PUBLICATIONS

Chinese Office Action issued in CN 201110346234.8, dated Feb. 7, 2014.

Office Action issued in related Japanese application No. 2011-240000, Sep. 1, 2015.

Chinese Office Action issued in application No. 201110346234.8, Apr. 15, 2015.

Partial English translation of CN101742136, and further discussed in Chinese Office Action for application No. 201110346234.8 on Apr. 15, 2015.

\* cited by examiner

RELAY APPARATUS, COMMUNICATION APPARATUS, AND CONTROL METHODS OF RELAY APPARATUS

CROSS-REFERENCE TO RELATED APPLICATION

This application is based upon and claims the benefit of priority of Japanese Patent Application No. 2010-247404 filed on Nov. 4, 2010, the contents of which are incorporated herein by reference in its entirety.

BACKGROUND

The invention relates to a relay apparatus and a communication apparatus for acquiring image data.

There have been known communication apparatuses for uploading electronic files of read images to servers, communication apparatuses for printing electronic files downloaded from servers, and the like. Japanese Patent Application Laid-Open No. 2005-269250 discloses an example of a communication apparatus for uploading electronic files of read images to a server. In a case where makers of communication apparatuses provide these services, the makers needs to prepare dedicated servers for storing uploaded electronic files on their own.

Meanwhile, recently, electronic-file storing services capable of storing electronic files in databases prepared on a network by service providers are in widespread use. For example, a Picasa (a registered trademark) web album and flickr (a registered trademark) are examples of the electronic-file storing services. Users can use personal computers having web browsers to upload or download desired electronic files in electronic-file storing services. Also, in a case where image data are downloaded in the electronic-file storing services, the image data may be downloaded after a size of an image to be formed by the image data is selected. In many electronic-file storing services, their own application program interfaces (API) are disclosed. Other business operators can use the APIs to provide new services cooperating with the electronic-file storing services to users.

SUMMARY

In this situation, services for downloading desired electronic files to communication apparatuses in the electronic-file storing services provided by service providers, instead of downloading desired electronic files from dedicated servers, can be considered.

An object of the present invention is to provide a technology capable of downloading an appropriate image to a communication apparatus in an electronic-file storing service.

An aspect of the disclosure provides the following arrangements:

A relay apparatus to be connected through a network to a server apparatus configured to store image data and a communication apparatus configured to acquire the image data from the server and output an image based on the acquired image data, the relay apparatus comprising:

a first receiving unit configured to receive a request for acquiring location information from the communication apparatus;

an acquiring unit configured to acquire the location information for acquiring the image data from the server apparatus upon receipt of the request; and a transmitting unit configured to transmit the acquired location information to the communication apparatus.

A communication apparatus to be connected through a network to a server apparatus configured to store image data and a relay apparatus, the communication apparatus comprising:

a first transmitting unit configured to transmit a request for acquiring location information to the relay apparatus;

a second transmitting unit configured to transmit data size identification information to the relay apparatus, the data size identification information identifying data size which the communication apparatus can output;

a receiving unit configured to receive the location information which is sent from the relay apparatus based on the data size identification information; and an image data acquiring unit configured to acquire the image data from the server apparatus based on the receive location information.

An image data acquiring method comprising:

receiving a request for acquiring location information from a communication apparatus by a relay apparatus;

acquiring the location information for acquiring the image data from the server apparatus upon receipt of the request by the relay apparatus; and transmitting the acquired location information to a communication apparatus.

DESCRIPTION OF EXEMPLARY EMBODIMENTS

Hereinafter, embodiments of the present invention will be described with reference to the accompanying drawings. The drawings to be referred to are used for explaining technical features usable in the present invention. Configurations of devices, apparatuses, and systems, flow charts of various processes, and the like to be described below are simple explanation examples. They are not intended to limit the present invention.

<Outline of Service Cooperation System 10>

Figure 1:
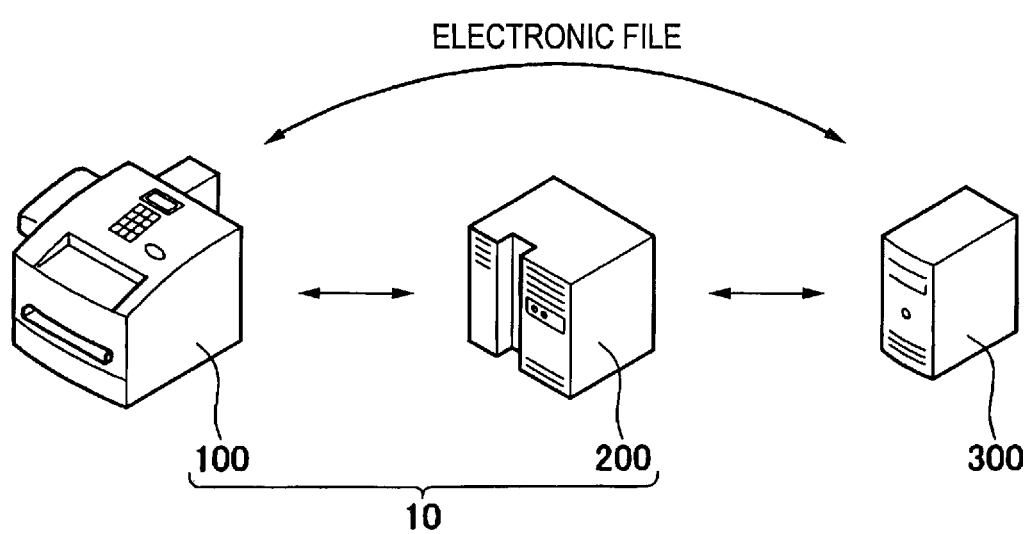
FIG. 1 is a schematic diagram illustrating an outline of a service cooperation system 10.

An outline of a service cooperation system 10 according to an embodiment of the present invention will be described with reference to FIG. 1. The service cooperation system 10 includes a multi-function device 100 and a relay apparatus 200. The service cooperation system 10 can upload or download an electronic file in an electronic-file storing service which a service provider provides.

The electronic-file storing service is provided by a service providing apparatus 300 which each service provider disposes on the Internet. Specifically, the service providing apparatus 300 is a known web server. The service providing apparatus 300 communicates with other terminals connected to the Internet on the basis of hypertext transfer protocol (HTTP) or hypertext transfer protocol security (HTTPS) so as to provide a predetermined service to the terminals.

Specifically, the multi-function device 100 is a small-sized digital combined machine. The multi-function device 100 has a print function, a scanner function, a fax function, and copy function. A user of the multi-function device 100 can upload an electronic file of an image read by the scanner function of the multi-function device 100 in the electronic-file storing service. The user of the multi-function device 100 can print an electronic file downloaded in the electronic-file storing service by the print function of the multi-function device 100.

The multi-function device 100 uploads and downloads electronic files in cooperation with the relay apparatus 200. The multi-function device 100 obtains URLs in the electronic-file storing service through the relay apparatus 200. The URLs includes an upload destination URL which is a URL of an upload destination of an electronic file in the electronic-file storing service, an electronic-file URL which is a URL of an electronic file to be downloaded in the electronic-file storing service, and the like. However, binary data of electronic files having large amounts of data are directly transmitted to and received in the electronic-file storing service without passing through the relay apparatus 200. Therefore, according to the service cooperation system 10, it is possible to suppress an amount of data passing through the relay apparatus 200. Further, it is possible to suppress a load of data processing on the relay apparatus 200.

The relay apparatus 200 may be a known apparatus having a server function. The relay apparatus 200 may also be prepared by a maker of the multi-function device 100, and it may also be considered to use, as the relay apparatus 200, a known rental server or a virtual machine as represented by elastic compute cloud (EC2) (which is a commercial web service for enabling a customer to rent computational resources to execute applications) of Amazon (a registered trademark). In this case, the operational cost of the relay apparatus 200 changes according to the amount of data passing through the relay apparatus 200 and the load of processing on the relay apparatus 200. As described above, in the case where a rental server or a virtual machine is used, the operational cost of the relay apparatus 200 can be suppressed by reducing the amount of data passing through the relay apparatus 200 or reducing the load of data processing on the relay apparatus 200. Even in a case where the maker of the multi-function device 100 prepares the relay apparatus 200 on maker's own, since the relay apparatus 200 does not need high processing performance, the equipment investment for the relay apparatus can be suppressed.

<Software Configuration of Service Cooperation System 10>

Figure 2:
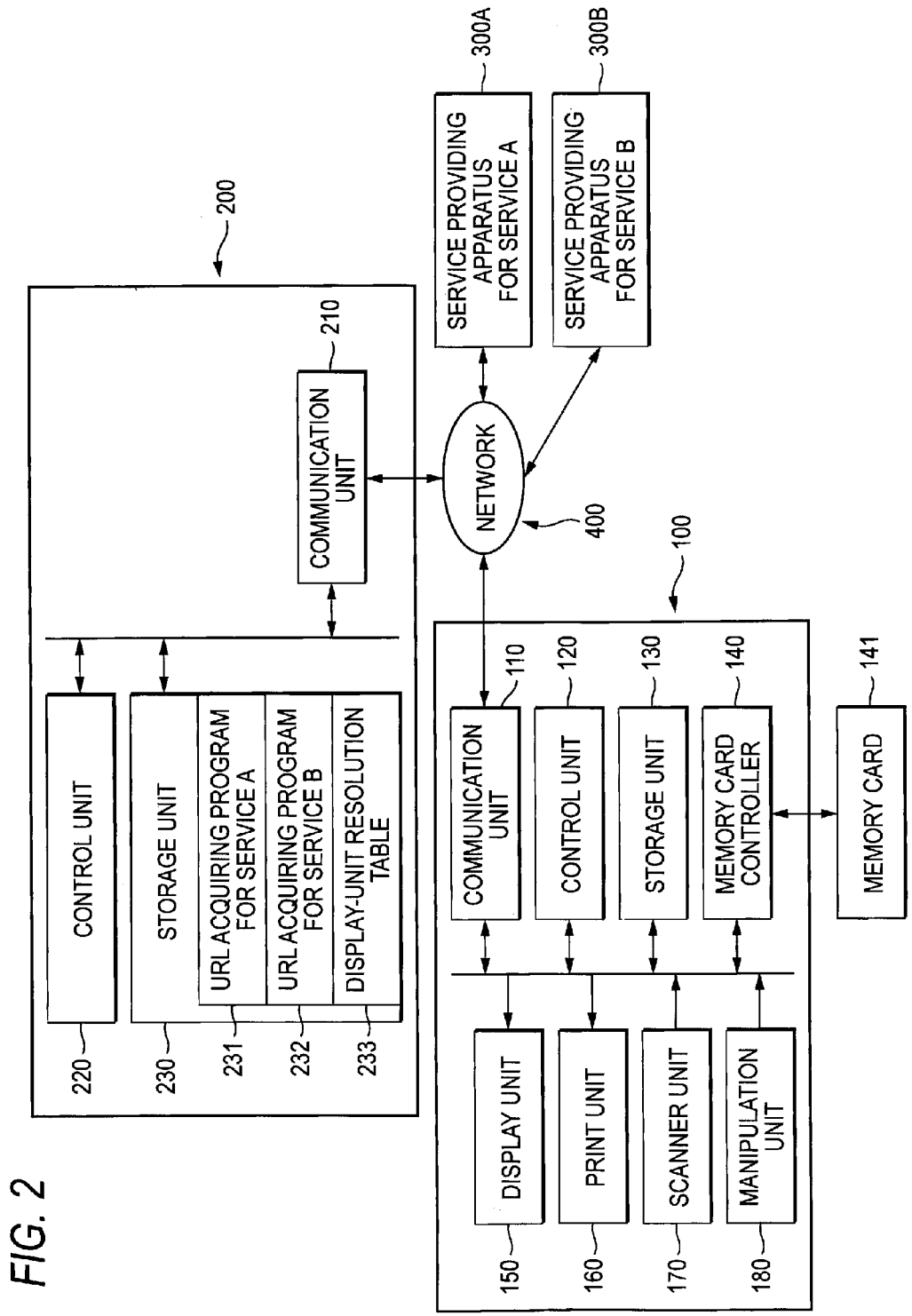
FIG. 2 is a block diagram illustrating a hardware configuration of the service cooperation system 10.

A software configuration of the service cooperation system 10 will be described with reference to FIG. 2. The following description will be made on assumption that the service cooperation system 10 cooperates with two electronic-file storing services, that is, a service A and a service B. In the following description, a service providing apparatus 300 for the service A is referred to as a service providing apparatus 300A. A service providing apparatus 300 for the service B is referred to as a service providing apparatus 300B. In a case where it is unnecessary to particularly distinguish both sides from each other, the service providing apparatus 300A and the service providing apparatus 300B are generally referred to as the service providing apparatus 300. The multi-function device 100, the relay apparatus 200, the service providing apparatus 300A, and the service providing apparatus 300B are connected to one another through a network 400. As the network 400, for example, an Ethernet network can be used. The multi-function device 100, the relay apparatus 200, and the service providing apparatus 300 perform data transmission and reception with one another on the basis of HTTP 1.1.

First, a software configuration of the multi-function device 100 will be described. The multi-function device 100 includes a communication unit 110, a control unit 120, a storage unit 130, a memory card controller 140, a display unit 150, a print unit 160, a scanner unit 170, and a manipulation unit 180.

The communication unit 110 is a device for performing communication with other apparatuses connected to the network. As the communication unit 110, a known network card can be used. The control unit 120 includes a central processing unit (CPU), and a ROM and a RAM connected to the CPU (not shown). The CPU controls the operation of the multi-function device 100 in accordance with programs stored in the ROM. The ROM stores programs including a rendering driver for generating a screen on the basis of a text written in a markup language such as the extensible markup language (XML). The RAM is a storage device for temporarily storing various kinds of data.

The storage unit 130 is a non-volatile storage device such as a NAND-type flash memory. The storage unit 130 stores user identification information for identifying a user of the multi-function device 100, a model name of the multi-function device 100, various kinds of set information, etc.

The memory card controller 140 controls the memory of a memory card 141 inserted into the multi-function device 100. Specifically, the memory card controller 140 performs writing of data in the memory card 141, erasing of data stored in the memory card 141, reading of data stored in the memory card 141, or the like, on the basis to an instruction of the control unit 120. In the memory card 141, electronic files having predetermined formats are stored.

The display unit 150 is a display device having a display such as a known LCD. The display unit 150 displays menu item selection screens and predetermined images such as thumbnail images (to be described below), on the basis of an instruction from the control unit 120. The resolution (total number of display pixels) of the display unit 150 is predetermined for each model of multi-function device 100. For example, in a case where the display unit 150 is a video graphics array type, the display unit 150 has the number of dot pixels of 640×480. In a case where a data size of image data (which is the total number of pixels when the image data is converted into pixel data for display) is smaller than the resolution of the display unit 150, an image generated by the image data is enlarged and displayed on the display unit 150. Therefore, the image displayed on the display unit 150 becomes rough. Meanwhile, in a case where the data size (number of pixels) of the image data is larger than the resolution of the display unit 150, the pixels of the image generated by the image data are thinned out and are displayed on the display unit 150. In this case, although the image displayed on the display unit 150 is not detail, an extra memory capacity for holding the image data and an extra time for image data communication are required. For these reasons, it is preferable that the resolution of the display unit 150 should be approximate to the data size (number of pixels) of image data for generating an image to be displayed on the display unit 150.

The print unit 160 is a device which prints images according to an instruction of the control unit 120. The scanner unit 170 is a device that reads images recorded on a sheet set by a user. The scanner unit 170 reads images according to an instruction of the control unit 120. The manipulation unit 180 is a device that includes a plurality of manipulation buttons manipulable by the user, and transmits signals based on the pushing manipulation of the user to the control unit 120. The user can input a desired instruction by manipulating the manipulation unit 180.

Next, a software configuration of the relay apparatus 200 will be described. The description of the present embodiment will be made on assumption that the relay apparatus 200 is a physically existing server. However, as described above, the relay apparatus 200 may be a virtual machine, such as EC2, which functions as a server in cooperation with a plurality of physical apparatuses.

The relay apparatus 200 includes a communication unit 210, a control unit 220, and a storage unit 230. The communication unit 210 is a device for performing communication with other apparatuses connected to the network. As the communication unit 210, a known network card can be used. The control unit 220 includes a CPU, and a ROM and a RAM connected to the CPU (not shown). The CPU controls the operation of the relay apparatus 200 according to programs stored in the ROM and the storage unit 230. The RAM is a storage device for temporarily storing various kinds of data. The storage unit 230 is a non-volatile storage device such as a hard disk drive. The storage unit 230 stores a plurality of software modules including a URL acquiring program 231 for the service A and a URL acquiring program 232 for the service B. The storage unit 230 stores a relay program (not shown) for relaying communication between the multi-function device 100 and the service providing apparatus 300 in cooperation with the plurality modules. Further, the storage unit 230 stores a display-unit resolution table 233. The display-unit resolution table 233 is a table storing the correspondence between each model name of the multi-function device 100 and the resolution of the display unit 150 used in the corresponding model. The resolution of the display unit 150 can be found out from the model name by using the display-unit resolution table 233. Therefore, even when resolutions of display units 150 are different for each model of multi-function device 100, it is possible to identify the resolution of the display unit 150 of the multi-function device 100 which is the other end of a communication, on the basis of the model name.

The URL acquiring program 231 for the service A is a program that acquires a thumbnail URL or an upload destination URL from the service providing apparatus 300A by using an API disclosed in the service A. The thumbnail URL is a URL indicating a storage position of a thumbnail image which is displayed for enabling a user to select an electronic file to be downloaded. The service providing apparatus 300A prepares the thumbnail URL for each data size of thumbnail image data. For example, in a case where data of a thumbnail image has three sizes, small, medium, and large, a thumbnail URL for accessing the data of the thumbnail image having each of three sizes is prepared.

The URL acquiring program 232 for the service B is a program that acquires a thumbnail URL or an electronic-file URL from the service providing apparatus 300B by using an API disclosed in the service B.

The user of the multi-function device 100 can designate a desired service of a plurality of electronic-file storing services. Then, the user of the multi-function device 100 can upload a desired electronic file in the designated service. The user of the multi-function device 100 can select which to print an electric file downloaded in the electronic-file storing service or to store the downloaded electronic file in the memory card 141.

<Operation of Service Cooperation System 10>

Figure 3:
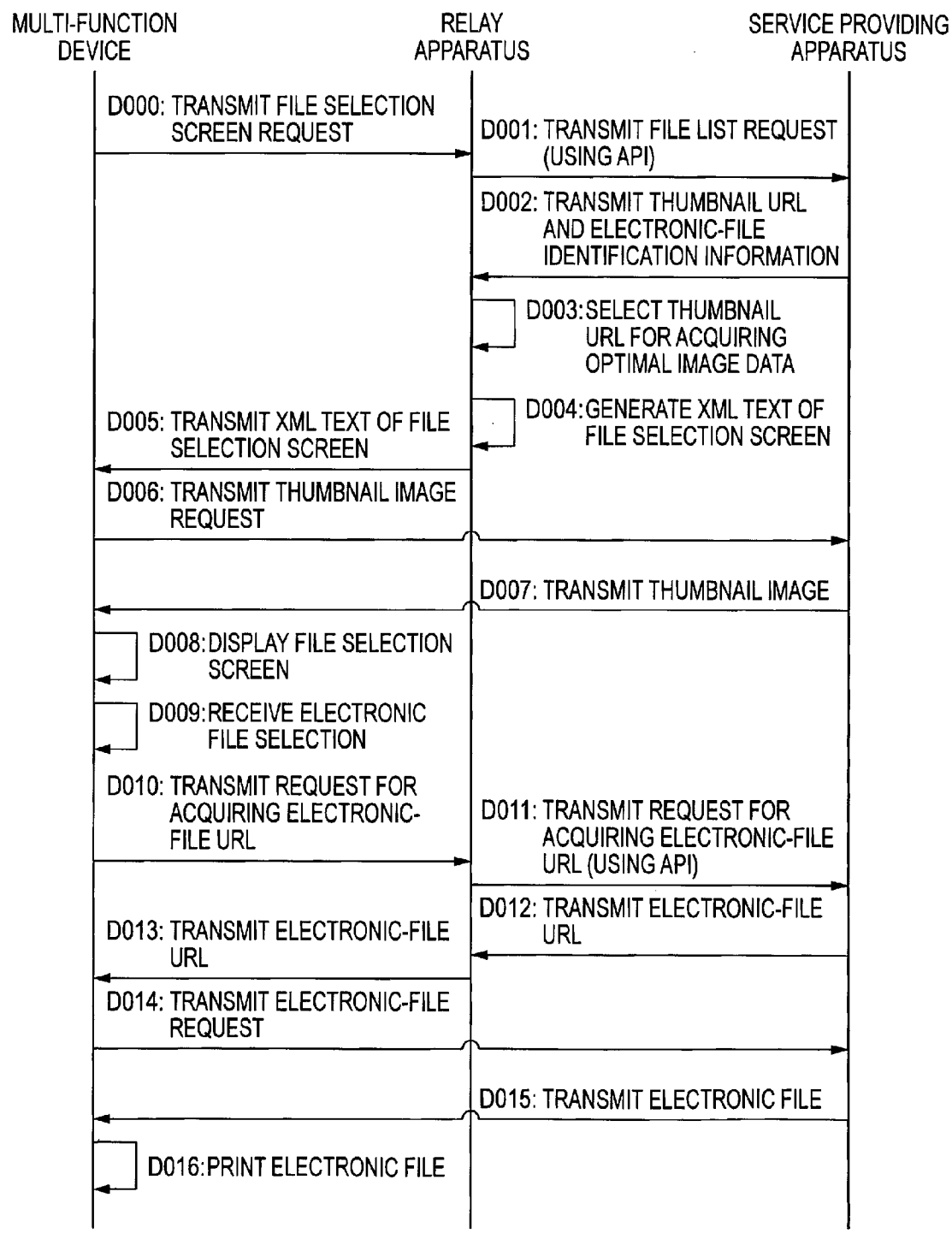
FIG. 3 is a flow chart illustrating an example of an operation of the service cooperation system 10.

Next, an example of the operation of the service cooperation system 10 will be described with reference to FIG. 3. FIG. 3 is a flow chart illustrating an example of the operation of the service cooperation system 10. In this example, a flow in a case where the user of the multi-function device 100 selects printing of the electronic file downloaded in the electronic-file storing service will be described. In the following description, the electronic-file storing service is simply referred to as the service.

First, if the user manipulates the manipulation unit 180 of the multi-function device 100 to select a service for downloading an electronic file, in step D000, the multi-function device 100 transmits a file selection screen request to the relay apparatus 200. The file selection screen request includes service identification information that is information for identifying the service selected by the user, user identification information that is information for identifying the user, and a model name that is information for identifying the resolution of the display unit 150.

If receiving the file selection screen request, in step D001, the relay apparatus 200 transmits a file list request to the service providing apparatus 300 for the service selected by the user. The file list request is a message for receiving a thumbnail URL which is a URL of a thumbnail image of an electronic file corresponding to a predetermined search condition, and electronic-file identification information which is information for identifying the electronic file corresponding to the thumbnail URL, from the service providing apparatus 300.

The file list request includes search condition information which is information on the search condition. If receiving the file list request, in step D002, the service providing apparatus 300 searches for electronic files corresponding to the search condition information, and returns the thumbnail URLs of the electronic files, and the electronic-file identification information for identifying the electronic files to the relay apparatus 200.

In step D001, the relay apparatus 200 can also identify the service and the user on the basis of the service identification information and the user identification information included in the file selection screen request received from the multi-function device 100. Then, the relay apparatus 200 generates the file list request corresponding to the service and the user, and transmits the file list request to the service providing apparatus 300. At this time, the relay apparatus 200 generates the file list request according to the program based on the service designated by the user.

Specifically, in a case where the service A is designated by the user, the relay apparatus 200 executes the URL acquiring program 231 for the service A stored in the storage unit 230 so as to generate the file list request corresponding to the service A, and transmits the file list request to the service providing apparatus 300A. The generated file list request is an HTTP message using the API disclosed in the service A. APIs for acquiring thumbnail URLs and electronic-file identification information are different for each service. For this reason, the relay apparatus 200 has programs for generating the file list request according to each service. Specifically, the relay apparatus 200 has the URL acquiring program 231 for the service A for generating the file list request for service A, and the URL acquiring program 232 for the service B for generating the file list request for service B. The relay apparatus 200 uses these program to generate the file list request corresponding to each service.

The kinds of search condition information stored in the generated file list requests are different for each service. For example, in a case where in order to search for a list of downloadable electronic files, the service providing side requires information such as an album ID for identifying the electronic-file storage position in the service, the information, such as an album ID of an album used by the user, for identifying the electronic-file storage position is stored as the search condition information in the file list request. In a case where in order to search for a list of downloadable electronic files, the service providing side requires information such as a folder name for identifying the electronic-file storage position in the service, the information, such as a folder name of a folder used by the user, for identifying the electronic-file storage position is stored as the search condition information in the file list request.

Additional information other than the search condition information may be stored in the file list request. For example, in a case where authentication information on the user is required for authenticating the user in the service, the authentication information may be stored in the file list request. The search condition information and the additional information such as the authentication information are stored in the storage unit 230 in advance. The relay apparatus 200 generates the file list request according to each service, by using necessary additional information.

If receiving the file list request, the service providing apparatus 300 transmits the thumbnail URL and the electronic-file identification information corresponding to the file list request, to the relay apparatus 200 in step D002. In this case, if there are a plurality of electronic files corresponding to the received file list request, the service providing apparatus 300 transmits a plurality of thumbnail URLs and electronic-file identification information corresponding to the plurality of electronic files, to the relay apparatus 200. The service providing apparatus 300 transmits a plurality of thumbnail URLs for accessing data of thumbnail images having different sizes for each electronic file. For example, in a case where image data of one thumbnail image has three data sizes, three thumbnail URLs corresponding to the three data sizes are transmitted. At this time, the service providing apparatus 300 may transmit, to the relay apparatus 200, size information of the plurality of thumbnail images. The size information may be added to the data of the thumbnail URL, or may be separately transmitted to the relay apparatus 200. Further, for example, the relay apparatus 200 may download the thumbnail images using the transmitted thumbnail URLs to know data sizes of the thumbnail images. Further, in the case that the thumbnail images are stored in the service providing apparatus 300 according to a rule which defines a relation between data size information of the thumbnail images and the storage address of the thumbnail image, such as the thumbnail URLs, the relay apparatus 200 can know the data size of the thumbnail image by using the rule.

The relay apparatus 200 receives the plurality of thumbnail URLs from the service providing apparatus 300. Then, in step D003, the relay apparatus 200 selects a thumbnail URL for acquiring thumbnail image data having a data size appropriate for displaying on the display unit 150 of the multi-function device 100, from the plurality of received thumbnail URLs.

In step D004, the relay apparatus 200 generates an XML text of a file selection screen to be displayed on the multi-function device 100, on the basis of the selected thumbnail URL and the received electronic-file identification information. The file selection screen is a screen for enabling the user to select an electronic file to be downloaded at the multi-function device 100. On the file selection screen, thumbnail images of a plurality of electronic files are arranged. If the user selects a thumbnail image of a desired electronic file from them, the electronic file corresponding to the selected thumbnail image is downloaded. The generated XML text includes the thumbnail URL selected in step D003 and the electronic-file identification information. Further, in the XML text, it is defined in advance that, in a case where the user selects a thumbnail image, a request for acquiring an electronic-file URL, including the electronic-file identification information corresponding to the thumbnail image, should be transmitted to the relay apparatus 200.

In step D005, the relay apparatus 200 transmits a message including the XML text of the file selection screen generated in step D004, to the multi-function device 100. If receiving the XML text of the file selection screen, the multi-function device 100 performs rendering according to the XML text. In step D006, on the basis of the thumbnail URL included in the XML text, the multi-function device 100 transmits a thumbnail image request to the service providing apparatus 300.

Specifically, the thumbnail image request is an HTTP message using a GET method. The thumbnail image request includes the thumbnail URL acquired from the relay apparatus 200. A server performing communication based on HTTP should support the general GET method. Therefore, even if there are no programs for generating the thumbnail image request according to each service, the multi-function device 100 can download a thumbnail image in each service, by using the GET method generally used for downloading data. The multi-function device 100 can download data of a thumbnail image having a data size appropriate for displaying on the display unit 150 of the multi-function device 100, by using the thumbnail URL selected in step D003. If acquiring a plurality of thumbnail URLs from the relay apparatus 200, the multi-function device 100 transmits the thumbnail image request to each of the acquired thumbnail URLs of the service providing apparatus 300.

If receiving the thumbnail image request, the service providing apparatus 300 transmits the thumbnail images stored in the URL included in the received thumbnail image request, to the multi-function device 100 in step D007. If receiving the thumbnail images from the service providing apparatus 300, the multi-function device 100 displays the electronic-file selection screen on the display unit 150 in step D008. On the electronic-file selection screen, the thumbnail images received from the service providing apparatus 300 are arranged. Therefore, the user can look for a desired electronic file while browsing the thumbnail images.

After displaying the electronic-file selection screen, the multi-function device 100 receives a selection of an electronic file from the user in step D009. The user may select the desired electronic file by manipulating the manipulation unit 180.

If the user selects the desired electronic file, the multi-function device 100 transmits the request for acquiring the electronic-file URL to the relay apparatus 200 in step D010. The request for acquiring the electronic-file URL includes the user identification information for identifying the user of the multi-function device 100, the service identification information for identifying the service selected by the user, the electronic-file identification information on the electronic file selected by the user, and the model name of the multi-function device 100.

If receiving the request for acquiring the electronic-file URL, in step D011, the relay apparatus 200 transmits an electronic-file URL request to the service providing apparatus 300 for the service selected by the user. The electronic-file URL request includes the electronic-file identification information received from the multi-function device 100. The relay apparatus 200 can identify the service to be used for transmission of the request for acquiring the electronic-file URL, on the basis of the service identification information included in the received request for acquiring the electronic-file URL. Then, the relay apparatus 200 generates the electronic-file URL request corresponding to the service, and transmits the electronic-file URL request to the service providing apparatus 300. In this case, the relay apparatus 200 generates the electronic-file URL request according the URL acquiring program based on the service designated by the user.

Specifically, in a case where the user designates the service A, the relay apparatus 200 generates the electronic-file URL request corresponding to the service A, in accordance with the URL acquiring program 231 for the service A stored in the storage unit 230, and transmits the electronic-file URL request to the service providing apparatus 300A. Similarly to this file list request, the generated electronic-file URL request is an HTTP message using the API disclosed in the service A. APIs for acquiring electronic-file URLs are different for each service. For this reason, the relay apparatus 200 has programs for generating electronic-file URL requests according to each service. Specifically, the relay apparatus 200 has the URL acquiring program 231 for the service A for generating the electronic-file URL request for the service A, and the URL acquiring program 232 for the service B for generating the electronic-file URL request for the service B. The relay apparatus 200 executes the URL acquiring programs so as to generate the electronic-file URL requests corresponding to each service.

Similarly to the file list request, in a case where some additional information is required for the electronic-file URL request to be generated, the relay apparatus 200 generates the electronic-file URL request using the additional information stored in the storage unit 230 in advance.

If receiving the electronic-file URL request, in step D012, the service providing apparatus 300 transmits the URL of the electronic file corresponding to the electronic-file URL request, as an electronic-file URL to the relay apparatus 200.

If receiving the electronic-file URL from the service providing apparatus 300, the relay apparatus 200 transmits the received electronic-file URL to the multi-function device 100 in step D013.

If acquiring the electronic-file URL, the multi-function device 100 transmits an electronic file request to the service providing apparatus 300 in step D014.

Specifically, the electronic file request is an HTTP message using the GET method. The electronic file request includes the electronic-file URL acquired from the relay apparatus 200. Similarly to the thumbnail image request, even if there is no program for generating a message according to each service, the multi-function device 100 can download the desired electronic file by transmitting the HTTP message using the GET method.

If receiving the electronic file request, the service providing apparatus 300 transmits the electronic file stored at the URL included in the electronic file request, to the multi-function device 100 in step D015.

If receiving the electronic file from the service providing apparatus 300, the multi-function device 100 prints the received electronic file in step D016. In this way, the user can download the desired electronic file in the electronic-file storing service, and print the downloaded electronic file.

<Operation of Multi-Function Device 100>

Figure 4:
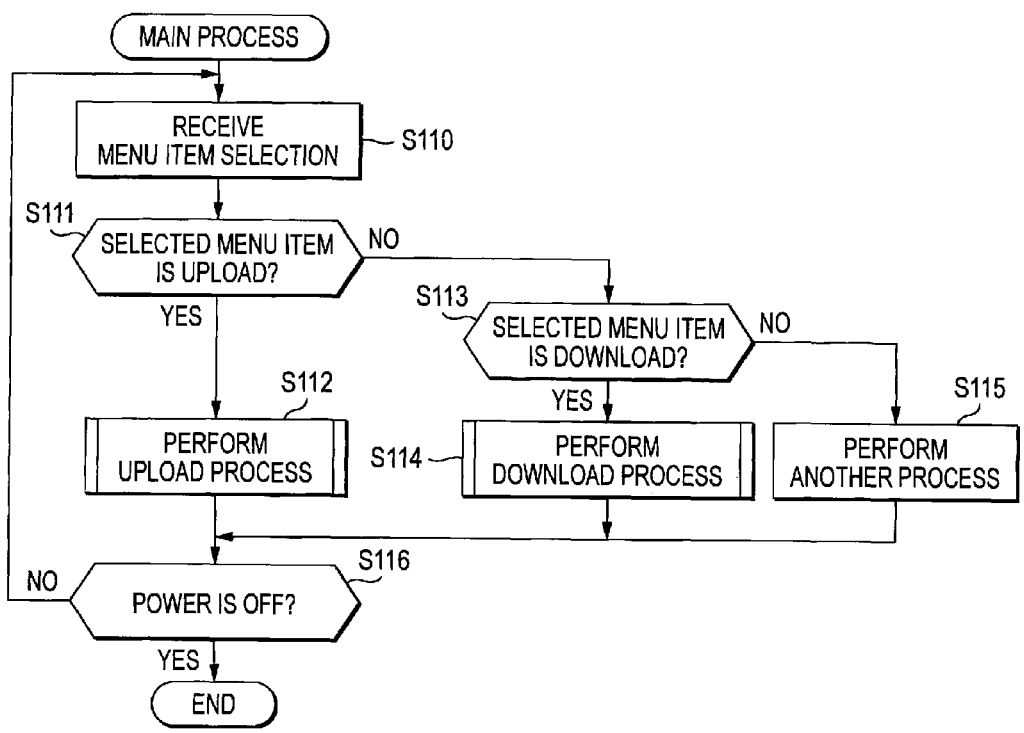
FIG. 4 is a flow chart illustrating a main process.
Figure 5:
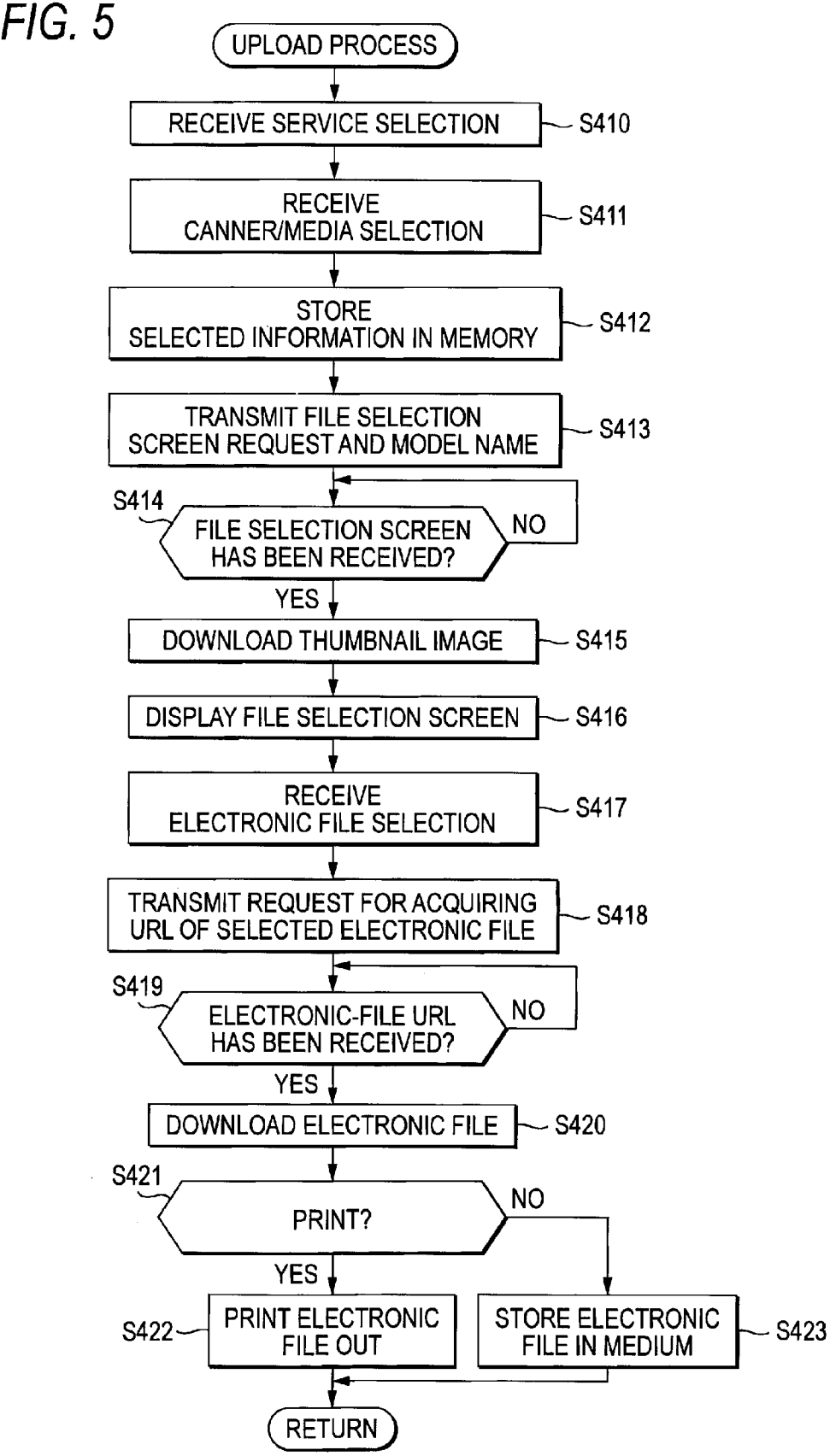
FIG. 5 is a flow chart illustrating a download process.

Next, a detailed operation of the multi-function device 100 will be described with reference to FIGS. 4 and 5. If power of the multi-function device 100 is turned on, the control unit 120 of the multi-function device 100 starts a main process shown in FIG. 4 in accordance with a predetermined program stored in the ROM.

First, in step S110, the control unit 120 displays a menu item selection screen on the display unit 150, and receives a menu item selection from the user. On the menu item selection screen, a plurality of menu items are displayed. The user can select a desired menu item by manipulating the manipulation unit 180. The plurality of menu items includes at least menu items of 'UPLOAD' and 'DOWNLOAD'. The menu item 'UPLOAD' is a menu item that is selected for uploading a desired electronic file in an electronic-file storing service. The menu item 'DOWNLOAD' is a menu item that is selected for downloading a desired electronic file in the electronic-file storing service.

After receiving the menu item selection from the user, in step S111, the control unit 120 determines whether the selected menu item is 'UPLOAD' or not. In a case where the selected menu item is 'UPLOAD' (Yes in step S111), in step S112, the control unit 120 performs an upload process. The upload process is a process for uploading an electronic file of an image read by the scanner unit 170, in the service selected by the user.

In a case where the selected menu item is not 'UPLOAD' (No in step S111), in step S113, the control unit 120 determines whether the selected menu item is 'DOWNLOAD' or not. In a case where the selected menu item is 'DOWNLOAD' (Yes in step S113), in step S114, the control unit 120 performs a download process to be described below. The download process is a process for downloading an electronic file in the service selected by the manipulation of the user. Meanwhile, in a case where the selected menu item is not 'DOWNLOAD' (No in step S113), in step 115, the control unit 120 performs another process according to the menu item selection.

After performs any one of steps S112, S114, and S115, in step S116, the control unit 120 determines whether the user has performed manipulation for turning off the power, or not. In a case where the user has not performed the manipulation for turning off the power (No in step S116), the control unit 120 returns to the processes of step S110 and repeats steps S110 to S115. In a case where the user has performed the manipulation for turning off the power (Yes in step S116), the control unit 120 turns off the power of the multi-function device 100, thereby ending the main process.

Next, the download process will be described in detail with reference to FIG. 5. If the download process starts, in step S410, the control unit 120 displays a service selection screen on the display unit 150, and receives a selection of a desire service from the user. In the present embodiment, the user can select the desired service from the service A and service B. If the user selects any service, the control unit 120 stores the service identification information for identifying the service selected by the user, in the RAM.

After receiving the service selection, in step S411, the control unit 120 displays the print/media selection screen on the display unit 150 to enable the user to select a use method of an electronic file to be downloaded. On the print/media selection screen, items 'PRINT' and 'MEDIA' are displayed as selection items for the use method of the electronic file to be downloaded in this service. The item 'PRINT' is an item for printing the electronic file to be downloaded by the print unit 160. Meanwhile, the item 'MEDIA' is an item for storing the electronic file to be downloaded.

After displaying the print/media selection screen, in step S411, the control unit 120 receives a selection of the use method from the user. The user can select the use method by manipulating the manipulation unit 180. If receiving the selection of the use method from the user, in step S412, the control unit 120 stores the use method, selected in step S411 by the user, in the RAM.

After storing the use method in the RAM, the control unit 120 transmits the file selection screen request to the relay apparatus 200 in step S413. As described above, the file selection screen request includes the service identification information, the user identification information, and the model name of the multi-function device 100. As this service identification information, the service identification information stored in the RAM in step S410 may be used. The storage unit 130 stores the user identification information for identifying the user of the multi-function device 100 in advance. As the user identification information of the file selection screen request, the user identification information stored in the storage unit 130 may be used. In a case where a plurality of users share one multi-function device 100, if a user selects the menu item 'DOWNLOAD', the control unit 120 may perform a login process for the user by a known method so as to identify the user identification information on the user that is manipulating the multi-function device 100.

After transmitting the file selection screen request, the control unit 120 determines whether the XML text of the file selection screen has been received from the relay apparatus 200, or not, in step S414. In a case where the XML text of the file selection screen has not been received from the relay apparatus 200 (No in step S414), the control unit 120 stands by until the XML text of the file selection screen is received. Meanwhile, in a case where the XML text of the file selection screen has been received from the relay apparatus 200 (Yes in step S414), the control unit 120 performs the rendering on the basis of the XML text of the file selection screen. In step S415, on the basis of the thumbnail URL included in the XML text, the control unit 120 downloads the thumbnail image from the service providing apparatus 300. Specifically, as described with respect to steps D006 and D007, the control unit 120 transmits the thumbnail image request to the service providing apparatus 300, and receives the thumbnail image from the service providing apparatus 300.

After downloading the thumbnail image, in step S416, the control unit 120 displays the file selection screen on the display unit 150. After displaying the file selection screen, in step S417, the control unit 120 receives a selection of an electronic file to be downloaded, from the user.

If the user selects an electronic file to be downloaded, in step S418, the control unit 120 transmits the request for acquiring the electronic-file URL to the relay apparatus 200. The transmitted request for acquiring the electronic-file URL includes the electronic-file identification information for identifying the electronic file selected by the user.

After transmitting the request for acquiring the electronic-file URL, in step S419, the control unit 120 determines whether the electronic-file URL has been received from the relay apparatus 200. In a case where the electronic-file URL has not been received from the relay apparatus 200 (No in step S419), the control unit 120 stands by until the electronic-file URL is received from the relay apparatus 200.

Meanwhile, in a case where the electronic-file URL has been received from the relay apparatus 200 (Yes in step S419), in step S420, the control unit 120 downloads the electronic file from the service providing apparatus 300 on the basis of the received electronic-file URL. Specifically, as described with respect to steps D014 and D015, the control unit 120 transmits the electronic-file request to the service providing apparatus 300, and receives the electronic file from the service providing apparatus 300.

After downloading the electronic file, in step S421, the control unit 120 determines the use method stored in the RAM in step S412 is 'PRINT' or not. In a case where the use method selected by the user is 'PRINT' (Yes in step S421), the control unit 120 controls the print unit 160 to print the downloaded electronic file in step S422, and returns to the main process. In a case where the use method selected by the user is 'MEDIA' (No in step S421), the control unit 120 stores the downloaded electronic file in a predetermined area of the memory card 141 in step S423, and returns to the main process.

<Operation of Relay Apparatus 200>

Figure 6:
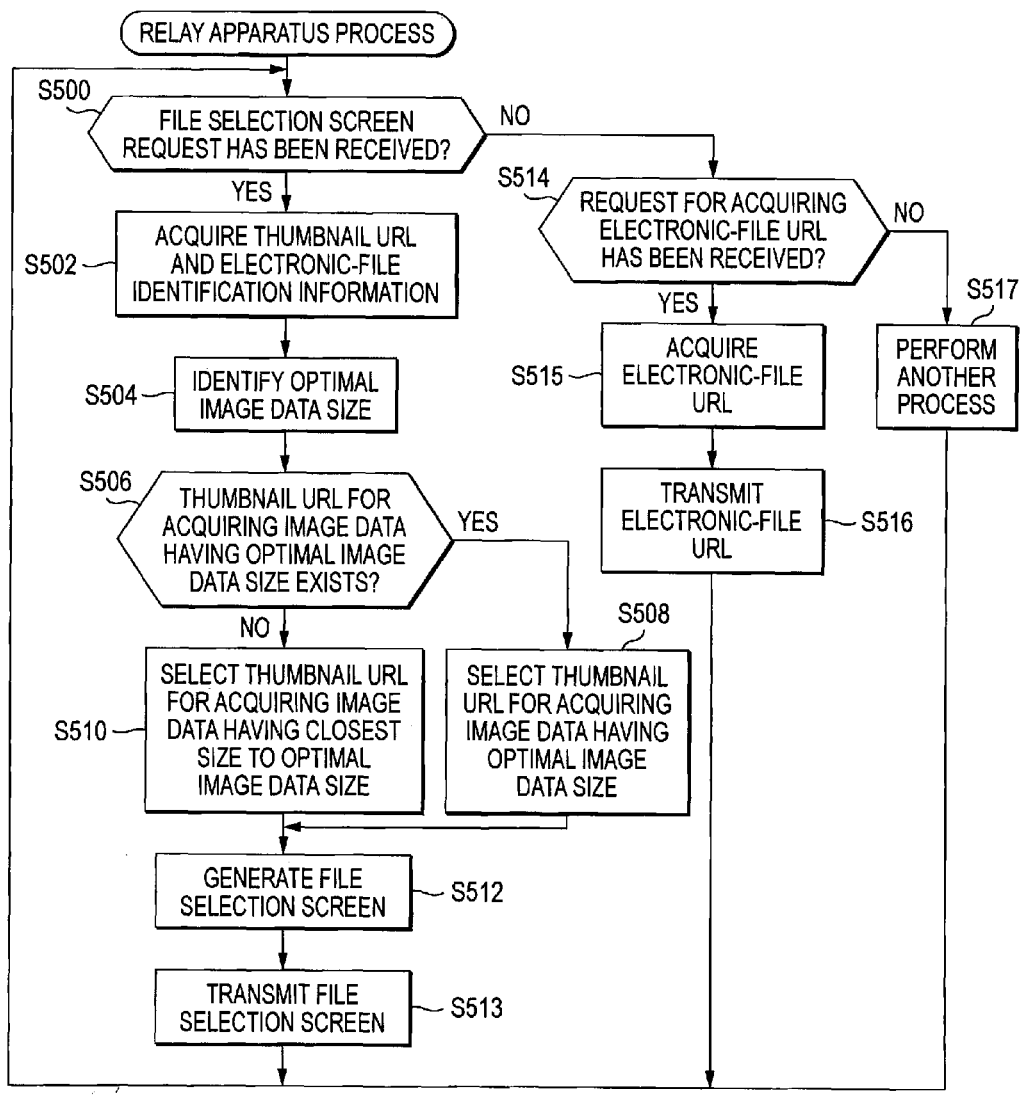
FIG. 6 is a flow chart illustrating a relay apparatus process.

Next, a detailed operation of the relay apparatus 200 will be described with reference to FIG. 6. If the relay program stored in the storage unit 230 starts to be executed, the control unit 220 of the relay apparatus 200 starts a relay apparatus process shown in FIG. 6 in accordance with various programs stored in the storage unit 230.

If the relay apparatus process starts, first, in step S500, the control unit 220 determines whether the file selection screen request has been received from the multi-function device 100 through packet communication.

In a case where it is determined that the file selection screen request has been received (Yes in step S500), in step S502, the control unit 220 acquires the thumbnail URL and the electronic-file identification information from the service providing apparatus 300. Specifically, as described with respect to step D001, the control unit 220 executes the URL acquiring program corresponding to the service identification information included in the received file selection screen request. The control unit 220 transmits the file list request to the service providing apparatus 300 under the control of the program corresponding to the service identification information. Then, the control unit 220 receives the thumbnail URL and the electronic-file identification information transmitted from the service providing apparatus 300. At this time, the control unit 220 receives all of the plurality of thumbnail URLs for accessing data of each of thumbnail images having different sizes.

In step S504, an optimal image data size of the display unit 150 of the multi-function device 100 is identified from the model name acquired from the multi-function device 100. Specifically, on the basis of the model name of the multi-function device 100 included in a packet of the file selection screen received in step S500, the display-unit resolution table 233 are searched such that the resolution of the display unit 150 is acquired. Then, from the resolution of the display unit 150, the optimal image data size, which is the size of image data appropriate for displaying on the display unit 150, is calculated. Here, the resolution of the display unit, that is, the total number of display pixels is referred to as the optimal image data size.

In step S506, the control unit 220 selects a thumbnail URL for acquiring image data appropriate for the optimal image data size, from the plurality of thumbnail URLs received from the service providing apparatus 300. Specifically, it is determined whether there is a thumbnail URL for acquiring image data having the same size as the optimal image data size. In a case where it is determined that the corresponding thumbnail URL exists (Yes in step S506), the control unit 220 proceeds to step S508. In step S508, the control unit 220 selects the thumbnail URL for acquiring the image data having the same size as the optimal image data size, as a thumbnail URL to be notified to the multi-function device 100.

Meanwhile, in a case where it is determined that the corresponding thumbnail URL does not exist (No in step S506), the control unit 220 proceeds to step S510. In step S510, the control unit 220 selects a thumbnail URL for acquiring image data having the closest size to the optimal image data size, as the thumbnail URL to be notified to the multi-function device 100, from thumbnail URLs having larger sizes than the optimal image data size. Since the image data having a size lager than the optimal image data size is selected, it is not required that the image data should be enlarged and displayed on the display unit 150. Therefore, it is possible to prevent a deterioration in the quality of the image displayed on the display unit 150 (such as occurrence of a shaggy contour line in the displayed screen).

After acquiring the thumbnail URL and the electronic-file identification information, in step S512, the control unit 220 generates the XML text of the file selection screen. The XML text of the file selection screen is generated as described with respect to step D004. Next, the control unit 220 transmits the XML text of the file selection screen to the multi-function device 100 in step S513, and returns to step S510.

In a case where it is determined in step S510 that the file selection screen request has not been received (No in step S500), in step S514, the control unit 220 determines whether the request for acquiring the electronic-file URL has been received from the multi-function device 100.

In a case where it is determined that the request for acquiring the electronic-file URL has been received from the multi-function device 100 (Yes in step S514), in step S515, the control unit 220 acquires the electronic-file URL from the service providing apparatus 300. Specifically, as described with respect to step D011, the control unit 120 executes the program corresponding to the service identification information included in the received request for acquiring the electronic-file URL so as to transmit the electronic-file URL request to the service providing apparatus 300, thereby acquiring the electronic-file URL.

After acquiring the electronic-file URL, the control unit 220 transmits the acquired electronic-file URL to the multi-function device 100 in step S516, and returns to step S500.

In a case where it is determined in step S514 that the electronic-file URL has not been received (No in step S514), the control unit 120 performs another process in step S517, and returns to step S500. When the multi-function device 100 uploads a desired image from the service providing apparatus 300, the relay apparatus 200 may perform a process for relaying the communication between the multi-function device 100 and the service providing apparatus 300 as a specific example of another process.

<Effect(s)>

In a case where the data size (number of pixels) of the image data received by the multi-function device 100 is larger than the resolution (total number of display pixels) of the display unit 150, the image displayed on the display unit 150 may not be detail, and the memory capacity for holding the image data or the time for communication of the image data increases. In this case, in a system in which charging is performed at a measured rate, the communication expense increases. Meanwhile, in a case where the data size (number of pixels) of the image data is smaller than the resolution of the display unit 150, since the image is enlarged and displayed, the display quality is deteriorated. For these reasons, according to the relay apparatus 200 according to the present invention, it is possible to acquire a thumbnail URL for acquiring thumbnail image data having a data size appropriate for displaying on the display unit 150, from the service providing apparatus 300. Accordingly, the image data having the size appropriate for the resolution of the display unit 150 can be acquired, such that it is possible to display a high-quality image while reducing the amount of data communication between the multi-function device 100 and the service providing apparatus 300.

According to the relay apparatus 200 according to the present invention, it is possible to select the thumbnail URL for acquiring the thumbnail image data having the data size appropriate for displaying on the display unit 150, from the plurality of acquired thumbnail URLs. Accordingly, the relay apparatus 200 can perform the process of selecting the thumbnail URL, and thus it becomes possible to reduce loads of processing on the service providing apparatus 300 and the multi-function device 100.

Further, according to the service cooperation system 10 according to the present invention, it is possible to print an electronic file downloaded in a desired service, and since the electronic file does not pass through the relay apparatus 200, it is possible to suppress the operational cost of the relay apparatus 200.

Furthermore, according to the service cooperation system 10 according to the present invention, one relay apparatus 200 can be connected to a plurality of multi-function devices 100, so as to make the plurality of multi-function devices 100 cooperate with the service. A business operator providing the service cooperation system to the user can maintain cooperation with another service only by updating the program, using the API, of the relay apparatus 200, if necessary.

The service providing apparatus 300 in the embodiment is an example of a service providing apparatus. The relay apparatus 200 in the embodiment is an example of a relay apparatus. The display unit 150 and the print unit 160 in the embodiment is an example of an output unit. The multi-function device 100 in the embodiment is an example of a communication apparatus. The thumbnail URL in the embodiment is an example of location information. The file selection screen request in the embodiment is an example of a request for acquiring the location information. The model name in the embodiment is an example of size identification information.

The control unit performing step S415 is an example of an image-data acquiring unit. The control unit performing step S500 is an example of a first receiving unit. The control unit performing step S502 is an example of an acquiring unit. The control unit performing step S513 is an example of a transmitting unit. The control unit performing step S500 is an example of a second receiving unit. The control unit performing step S502 is an example of a third receiving unit. The control unit performing step S506 is an example of a selecting unit.

It is apparent that the present invention is not limited to the above-mentioned embodiments, but may be variously modified without departing from the scope of the invention.

<Modifications>

In the embodiment, a case of optimizing the data size (number of pixels) of the thumbnail image data has been described. However, the present invention is not limited thereto. It is possible to optimize the data size of the electronic file (the total number of bytes of the file or the number of bytes of the image data included in the file). Here, examples of the electronic file include a file having a joint photographic experts group (JPEG) format and a file having a portable network graphics (PNG) format. In this case, in step D010 of FIG. 3, the request for acquiring the electronic-file URL may be received. In step D012, the relay apparatus 200 may receive a plurality of electronic-file URLs for accessing data of each of electronic files having different data sizes, from the service providing apparatus 300. Then, the relay apparatus 200 may select an electronic-file URL for acquiring data of an electronic file having a data size appropriate for printing in the print unit 160 of the multi-function device 100, from the plurality of received electronic-file URLs. As the method of selecting the data size appropriating for the print process in the print unit 160, various methods can be used. For example, as the capacity of the storage unit 130 increases or the processing speed of the CPU of the control unit 120 increases, it is possible to select an electronic file having a large data size. If the capacity of the storage unit 130 decreases or the processing speed of the CPU of the control unit 120 decreases, an electronic file having a large data size is not selected. In a case where the multi-function device 100 has hardware, a program, or the like for decompressing electronic file data compressed by JPEG, PNG, or the like, it is possible to select an electronic file having a larger data size. Next, in step D013, the relay apparatus 200 may transmit the selected electronic-file URL to the multi-function device 100. In steps D014 and D015, the multi-function device 100 receives the data of the electronic file having the data size appropriate for printing in the print unit 160, using the selected electronic-file URL. Therefore, it is possible to perform high-quality printing in the print unit 160 while preventing the amount of data communication between the multi-function device 100 and the service providing apparatus 300 from excessively increasing.

The size identification information for identifying the resolution of the display unit 150 of the multi-function device 100 which is the other end of a communication is not limited to the model name of the multi-function device 100, but may be various kinds of information. For example, the size identification information may be information (for example, VGA) directly representing the resolution of the display unit 150. The size identification information may be always included in a packet used for packet communication between the multi-function device 100 and the relay apparatus 200, or may be include in the packet only in specific cases (for example, a case of communicating the file selection screen request). In this case, the size identification information may be included in the packet in various forms. For example, the size identification information may be included in a header section, or may be included in a data section.

As the method of selecting a thumbnail URL for acquiring data of a thumbnail image having a data size (the number of pixels) appropriate for displaying on the display unit 150, various modifications may be exemplified. For example, in the embodiment, in step S510 of FIG. 6, the control unit 120 selects the thumbnail URL for acquiring the image data having the closest size to the optimal image data size, as the thumbnail URL to be notified to the multi-function device 100, from the thumbnail URLs having the sizes larger than the optimal image data size. However, the thumbnail URL for acquiring the image data having the closest size to the optimal image data size may be selected from the thumbnail URLs having the sizes smaller than the optimal image data size. Alternatively, the thumbnail URL for acquiring the image data having the closest size to the optimal image data size may be selected regardless of whether the closet size is larger or smaller than the optimal image data size.

In step D001 of FIG. 3, when the relay apparatus 200 transmits the file list request to the service providing apparatus 300, information designating the data size (number of pixels) of the image data may be transmitted. Then, in step D002, one thumbnail URL for acquiring the thumbnail image data having the optimal size may be returned. In this way, it is possible to reduce the amount of communication between the relay apparatus 200 and the service providing apparatus 300. A similar method may be applied to the method of selecting the electronic-file URL for acquiring the data of the electronic file having the data size (the total number of bytes of the file or the number of bytes of the image data included in the file) appropriate for printing in the print unit 160. Specifically, in step D011 of FIG. 3, when the electronic-file URL is requested, information designating the data size of the electronic file (the total number of bytes of the file or the number of bytes of the image data included in the file) may also be transmitted together.

The communication among the multi-function device 100, the relay apparatus 200, and the service providing apparatus 300 is not limited to the communication method based on HTTP. Even when other communication methods such as a communication method based on the file transfer protocol (FTP) are applied, the effects of the present invention can be achieved. In the HTTP-based communication, identification information for identifying a transmitter (for example, browser information in a personal computer in a case where the personal computer is the transmitter) is included in transmission data. Therefore, if the identification information included in the HTTP-based transmission data is diverted as the size identification information, it is not required to separately and newly transmit the size identification information. Meanwhile, in a communication method (for example, an FTP-based communication method) in which the identification information is not included in transmission data, it is required to separately and newly transmit the size identification information.

In the embodiment, in steps D006 and D007 of FIG. 3, the multi-function device 100 downloads the thumbnail image from the service providing apparatus 300. However, the present invention is not limited thereto. The multi-function device 100 may download the thumbnail image through the relay apparatus 200. Specifically, the following process may be performed. The multi-function device 100 may transmit the thumbnail URL included in the XML text received in step D005, to the relay apparatus 200. The relay apparatus 200 may download the thumbnail image from the service providing apparatus 300 on the basis of the thumbnail URL received from the multi-function device 100. Then, the relay apparatus 200 may transmit the thumbnail image downloaded from the service providing apparatus 300, to the multi-function device 100.

In the embodiment, the case where the additional information necessary for the file list request in step D001 (FIG. 3) is stored in the relay apparatus 200 in advance has been described. However, the present invention is not limit thereto. For example, whenever it is required to generate the file list request, the relay apparatus 200 may inquire about the necessary additional information from the multi-function device 100. The multi-function device 100 receiving the inquiry about the additional information may display an additional-information inquiry screen on the display unit 150, so as to enable the user to perform additional information input. At this time, the user can designate an album ID of a desired album or a file name. Then, the multi-function device 100 may transmit the additional information input or selected by the user, to the relay apparatus 200. Therefore, the relay apparatus 200 can identify the necessary additional information. In this case, the relay apparatus 200 may generate the inquiry screen corresponding to each service, in a markup language such as XML. This is because the kinds of additional information that should be input or selected by the user are different for each service. The relay apparatus 200 may transmit a message of the inquiry screen generated in the markup language such as XML, to the multi-function device 100. The multi-function device 100 may perform rendering on the basis of the received message, thereby capable of displaying the inquiry screen corresponding to the service designated by the user. The multi-function device 100 may further include a rendering driver written in markup languages such as XML, so as to be able to display the inquiry screen corresponding to each service. Therefore, the user can freely designate a desired album or folder for downloading thumbnail images according to each service.

In the embodiment, a URL is used as an address of a thumbnail image or an electronic file to be downloaded. However, the present invention is not limited thereto.

In the embodiment, in the relay apparatus process, the control unit 220 of the relay apparatus 200 generates the XML text of the file selection screen in step S512, and transmits the XML text of the file selection screen in step S513. However, the present invention is not limited thereto. For example, the relay apparatus 200 may transmit the entire electronic-file identification information and thumbnail URL received in each service, to the multi-function device 100. In this case, on the basis of the received electronic-file storing service and thumbnail URL, the multi-function device 100 may generate the file selection screen in accordance with a program prepared on maker's own by the maker.

In the embodiment, in step S502 of the relay apparatus process, the relay apparatus 200 acquires the thumbnail URL. However, the present invention is not limited thereto. For example, the relay apparatus 200 may acquire the file name of the electronic file by switching to the thumbnail URL, and the multi-function device 100 may display the file name by switching to the thumbnail image.

What is claimed is:

1. A non-transitory computer readable recording medium storing a computer program that, when executed by a relay apparatus, which is configured to be connected through a network to a server apparatus that is configured to store original image data and thumbnail image data, and an image processing apparatus that is configured to acquire the image data from the server apparatus and print an image based on the acquired image data, causes the relay apparatus to execute:

receiving a request from the image processing apparatus through the network;

if the request received from the image processing apparatus through the network corresponds to a first request, acquiring plural pieces of the location information for acquiring the thumbnail image data from the server apparatus through the network and electronic file identification information for identifying an electronic file corresponding to the original image data from the server apparatus through the network, each piece of the location information corresponding to each of a plurality of thumbnail images having different sizes;

selecting, from the plural pieces of the acquired location information at the relay apparatus, one piece of the location information for acquiring the thumbnail image data having a data size appropriate for being output by the image processing apparatus, associating the selected located information with the electronic file identification information and transmitting the selected location information and the electronic file identification information from the relay apparatus to the image processing apparatus through the network, the electronic file identification information identifying, on the server apparatus, original image data corresponding to the thumbnail image corresponding to the selected location information;

receiving, from the image processing apparatus through the network, data size identification information for identifying the data size appropriate for being output by the image processing apparatus communication apparatus;

storing the received data size identification information;

if the request received from the image processing apparatus through the network corresponds to a second request received after the first request and includes the electronic file identification information, acquiring electronic file location information for acquiring the electronic file from the server apparatus through the network, the second request being for acquiring the electronic file location information of the electronic file identified by the electronic file identification information included in the request; and transmitting the acquired electronic file location information to the image processing apparatus through the network, wherein selecting the one piece of location information for acquiring the thumbnail image data having the data size appropriate for being output by the image processing apparatus is based on the received data size identification information at the relay apparatus.

2. The non-transitory computer readable recording medium according to claim 1, wherein the computer program further causes the relay apparatus to execute:

identifying an image data size identified by the data size identification information; and determining whether the identified image data size matches a size of the thumbnail image data identified by the location information, selecting the location information so that the identified image data matches the size of the identified thumbnail image data.

3. The non-transitory computer readable recording medium according to claim 1, wherein the computer program further causes the relay apparatus to execute:

identifying an image data size identified by the data size identification information, wherein selecting the location information for acquiring the thumbnail image data is based on a closest data size to the identified image data size.

4. The non-transitory computer readable recording medium according to claim 3, wherein the data size of the thumbnail image data acquired based on the selected location information is larger than the identified image data size.

5. The non-transitory computer readable recording medium according to claim 1, wherein the computer program further causes the relay apparatus to execute:

acquiring the location information for acquiring the thumbnail image data having the data size which can be output by the image processing apparatus is based on the stored size identification information.

6. The non-transitory computer readable recording medium according to claim 1, wherein:
the data size identification information includes a model name of the image processing apparatus; and
the one piece of the location information is selected based on the model name of the image processing apparatus included in the data size identification information.

7. The non-transitory computer readable recording medium according to claim 6, wherein:
a memory of the relay apparatus stores the model name of the image processing apparatus and the appropriate data size, wherein the stored model name of the image processing apparatus and the appropriate data size are associated with each other; and
wherein selecting the one piece of location information further comprises:
identifying the appropriate data size, which is stored in the memory and associated with the model name included in the data size identification information received from the image processing apparatus; and
selecting the location information for acquiring the thumbnail image data having the data size appropriate for being output by the image processing apparatus.

8. The non-transitory computer readable recording medium according to claim 1, wherein the computer program, when executed by the relay apparatus, causes the relay apparatus to execute:
transmitting a file list request to the server apparatus through the network to acquire the plural pieces of the location information and the electronic file identification information.

9. The non-transitory computer readable recording medium according to claim 8, wherein the file list request includes search condition information which is information on search condition based on which the server apparatus searches for the electronic file.

10. A non-transitory computer readable recording medium storing a computer program, when executed by a computer of a relay apparatus configured to communicate, through a network, with an image processing apparatus including a printing unit, a first server apparatus providing a first service and a second server apparatus providing a second service, the relay apparatus storing a first program for accessing to the first server apparatus and using the first service and a second program for accessing to the second server apparatus and using the second service, causing the relay apparatus to execute:
a receiving instruction of receiving, from the image processing apparatus through the network, a first location information acquisition request and service identification information indicative of one of the first service and the second service;
an acquiring instruction of acquiring location information of first thumbnail data from the first server apparatus through the network according to the first program when the received service identification information identifies the first service, and acquiring location information of second thumbnail data from the second server apparatus according to the second program when the received service identification information identifies the second service;
a transmitting instruction of transmitting the acquired location information from the relay apparatus to the image processing apparatus through the network,
wherein when the received service identification information identifies the first service, the location information identifies a storage location of first thumbnail data in the first server apparatus, and
wherein when the received service identification information identifies the second service, the location information identifies a storage location of second thumbnail data in the second server apparatus;
a second receiving instruction of receiving, from the image processing apparatus through the network, a second location information acquisition request associated with an image hosted by one of the first service and the second service, the second location information acquisition request received after the first location information acquisition request;
a second acquiring instruction of acquiring location information of selected image data from one of the first server apparatus through the network and the second server apparatus through the network; and
a transmitting instruction of transmitting the acquired location information of selected image data to the image processing apparatus through the network.

11. The non-transitory computer readable recording medium according to claim 10, wherein the computer program, when executed by the relay apparatus, causes the relay apparatus to execute:
transmitting a file list request to the server apparatus through the network to acquire the plural pieces of the location information and the electronic file identification information.

12. The non-transitory computer readable recording medium according to claim 11, wherein the file list request includes search condition information which is information on search condition based on which the server apparatus searches for the electronic file.

* * * * *

UNITED STATES PATENT AND TRADEMARK OFFICE
CERTIFICATE OF CORRECTION

PATENT NO. : 9,674,379 B2  
APPLICATION NO. : 13/283436  
DATED : June 6, 2017  
INVENTOR(S) : Hideki Nogawa et al.

Page 1 of 1

It is certified that error appears in the above-identified patent and that said Letters Patent is hereby corrected as shown below:

In the Claims

Claim 1:
Column 18, Lines 15-16: Delete "the image processing apparatus communication apparatus;" and insert -- the image processing apparatus; -- therefor.

Signed and Sealed this
Twenty-ninth Day of May, 2018

Andrei Iancu
*Director of the United States Patent and Trademark Office*